United States Patent Office.

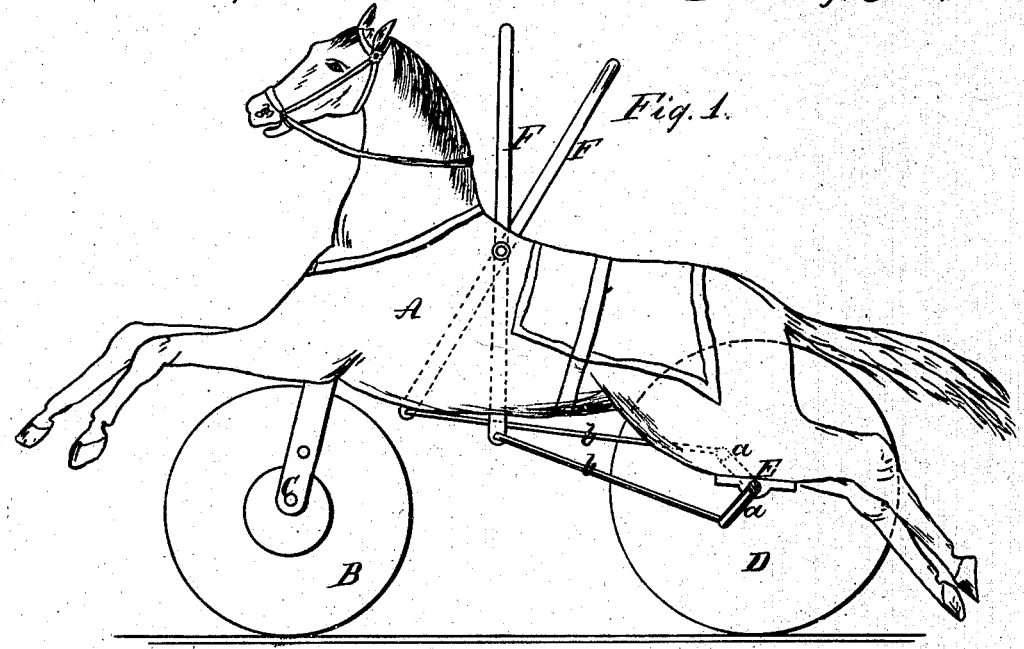
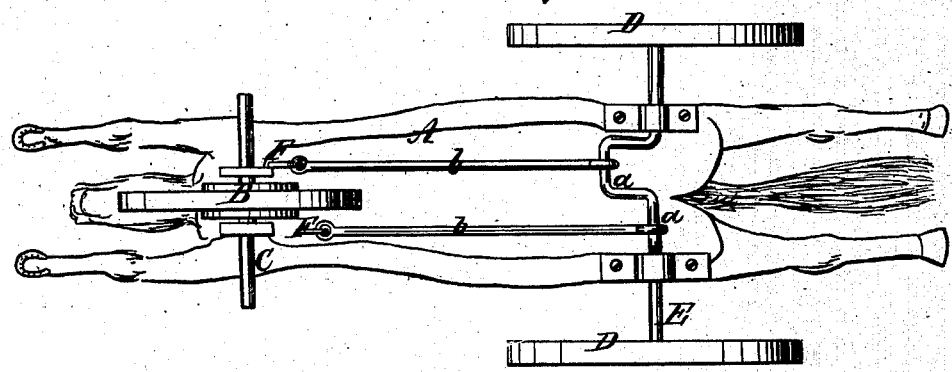

IMPROVEMENT IN PROPELLING HORSE.

JOHN H. BROWN, OF NEW YORK, N. Y.

Letters Patent No. 60,335, dated December 11, 1866.

The Schedule referred to in these Letters Patent and making part of the same.

TO ALL WHOM IT MAY CONCERN:

Be it known that I, JOHN H. BROWN, of 449 West street, in the city, county of New York, and State of New York, have invented a new and Improved Propelling Horse; and I do hereby declare that the following is a full, clear and exact description thereof, which will enable others skilled in the art to make and use the same, reference being had to the accompanying drawings, forming a part of this specification, in which—

Figure 1 represents a sectional side elevation of this invention.

Figure 2 is an inverted plan of the same.

Similar letters of reference indicate like parts.

This invention relates to a propelling horse, the front wheel of which is placed out of the centre, so that by its action the cantering motion of a horse is imitated. The hind wheels are rigidly attached to a double crank shaft, and the cranks connect with the hand-levers in such a manner that by the action of each hand-lever the tractive power of both wheels is utilized, and the horse can be propelled with considerable speed. The hand-levers pass through the body of the horse, which also encloses the connecting rods and cranks, so that the propelling mechanism does not interfere with the child's limbs or clothes. A represents a horse made of wood, or any other suitable material. This horse is supported in front by a wheel B, which is placed eccentrically on its axle C, so that the same in revolving imparts to the forepart of the horse's body a rising and falling motion, and the cantering motion of a horse is imitated. The hind part of the horse is supported by two wheels, D, which are rigidly attached to the ends of a double crank shaft E. The cranks $a$ $a$ of said shaft connect by rods $b$ $b$ with two hand-levers F F, which pass up through the body of the horse in a convenient position for the child which may occupy the horse. In ordinary propelling toys, or velocipedes, the hind wheels are placed loosely on their axle, and the hand-levers connect with eccentric wrist pins secured in the wheels. Each lever acts on one wheel only, and by these means much of the tractive power of said wheels is lost. By my arrangement each lever acts simultaneously on both wheels, and the full tractive power of said wheels is utilized, so that the propeller can be driven with great speed up or down grades, and comparatively little power is required to operate the same. The hand-levers pass down through the body of the horse, so that the same do not interfere with the child's legs, and the connecting rods and cranks are concealed under or in the horse, so that the same are not liable to catch the clothes or the hands or arms of the child.

Having thus described my invention, I claim as new, and desire to secure by Letters Patent—

The combination and arrangement of the wheel B, axle C, horse A, wheels D, shaft E, and hand-levers F F, as herein set forth, operating in the manner and for the purpose specified.

The above specification of my invention signed by me this 14th day of August, 1866.

JOHN H. BROWN.

Witnesses:
JAS. A. SERVICE,
WM. DEAN OVERELL.